(12) United States Patent
Fujiwara (10) Patent No.: US 11,052,635 B2
(45) Date of Patent: Jul. 6, 2021

(54) SHEET-TYPE MOLDED BODY, AND LAMINATE

(71) Applicant: ZEON CORPORATION, Tokyo (JP)

(72) Inventor: Takanori Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/746,130

(22) PCT Filed: Jul. 25, 2016

(86) PCT No.: PCT/JP2016/071776
§ 371 (c)(1),
(2) Date: Jan. 19, 2018

(87) PCT Pub. No.: WO2017/018390
PCT Pub. Date: Feb. 2, 2017

(65) Prior Publication Data
US 2018/0207908 A1 Jul. 26, 2018

(30) Foreign Application Priority Data
Jul. 29, 2015 (JP) .............................. JP2015-149260

(51) Int. Cl.
*B32B 7/09* (2019.01)
*B32B 5/18* (2006.01)
(Continued)

(52) U.S. Cl.
CPC ................ *B32B 7/09* (2019.01); *B29C 41/18* (2013.01); *B29C 44/14* (2013.01); *B29C 44/351* (2013.01);
(Continued)

(58) Field of Classification Search
CPC ... B60R 13/02–0275; B60R 2013/0281–0293; B60K 37/00–06;
(Continued)

(56) References Cited

U.S. PATENT DOCUMENTS 4,247,345 A * 1/1981 Kadija .................... B29C 65/72
156/73.4
4,748,078 A * 5/1988 Doi ........................ D04B 21/12
442/312
(Continued)

FOREIGN PATENT DOCUMENTS

CN 1977073 A 6/2007
DE 10244311 A1 4/2004
(Continued)

OTHER PUBLICATIONS

Machine translation of JP4391525B, obtained from Espacenet (Year: 2019).*
(Continued)

*Primary Examiner* — Z. Jim Yang
(74) *Attorney, Agent, or Firm* — Kenja IP Law PC (57) ABSTRACT

Provided is a sheet-type molded body that is formed by sewing a sheet, wherein thread is used for at least part of said sewing, the thread being composed of a resin composition for thread containing resin for thread, the thread having a melting point of no more than 200° C., and a laminate comprising: the sheet-type molded body; and a polyurethane foam formed body, the sheet-type molded body, and the laminate comprising: the sheet-type molded body; and a polyurethane foam layer being able to be produced by a simple method at low cost without damaging design qualities over time, and making it possible to prevent leakage of raw material etc. from sewed portions when backed with the polyurethane foam layer.

12 Claims, 2 Drawing Sheets

(51) Int. Cl.
| | |
|---|---|
| B29C 41/18 | (2006.01) |
| B32B 27/40 | (2006.01) |
| B32B 27/30 | (2006.01) |
| B60K 37/00 | (2006.01) |
| B32B 27/22 | (2006.01) |
| B29C 44/14 | (2006.01) |
| B29C 44/34 | (2006.01) |
| B32B 7/08 | (2019.01) |
| B32B 27/06 | (2006.01) |
| B60R 13/02 | (2006.01) |
| B29C 65/62 | (2006.01) |
| B29C 65/72 | (2006.01) |
| B29K 75/00 | (2006.01) |
| B29K 105/04 | (2006.01) |
| B29L 31/30 | (2006.01) |

(52) U.S. Cl.
CPC ............... *B32B 5/18* (2013.01); *B32B 7/08* (2013.01); *B32B 27/065* (2013.01); *B32B 27/22* (2013.01); *B32B 27/30* (2013.01); *B32B 27/304* (2013.01); *B32B 27/40* (2013.01); *B60K 37/00* (2013.01); *B60R 13/0256* (2013.01); *B29C 65/62* (2013.01); *B29C 65/72* (2013.01); *B29K 2075/00* (2013.01); *B29K 2105/04* (2013.01); *B29L 2031/3008* (2013.01); *B32B 2266/0278* (2013.01); *B32B 2605/003* (2013.01)

(58) Field of Classification Search
CPC .............. B29C 65/62; B29C 65/72; Y10T 428/24033–2405
See application file for complete search history.

(56) References Cited

U.S. PATENT DOCUMENTS

| | | | | | |
|---|---|---|---|---|---|
| 5,203,939 | A | * | 4/1993 | Sperling | D02G 3/46 156/148 |
| 5,225,214 | A | | 7/1993 | Filion | |
| 5,235,826 | A | * | 8/1993 | Brooks | D04B 1/22 297/452.58 |
| 5,682,771 | A | * | 11/1997 | Forest | B60N 2/58 66/198 |
| 5,887,452 | A | * | 3/1999 | Smith | B60N 2/5825 66/170 |
| 5,994,439 | A | * | 11/1999 | Masuda | C08K 5/12 524/285 |
| 2003/0168151 | A1 | * | 9/2003 | Wright | B29C 65/62 156/93 |
| 2005/0188907 | A1 | * | 9/2005 | D'Henin | A41D 27/24 112/475.09 |
| 2006/0014016 | A1 | * | 1/2006 | Lardizabal | D02G 3/402 428/375 |
| 2006/0165939 | A1 | * | 7/2006 | Hottner | B29C 66/13 428/57 |
| 2009/0142609 | A1 | * | 6/2009 | Kreuzer | C09J 7/22 428/473 |
| 2010/0171333 | A1 | * | 7/2010 | Smith | B60R 13/02 296/1.08 |
| 2013/0255103 | A1 | * | 10/2013 | Dua | B29C 66/244 36/87 |
| 2013/0260629 | A1 | * | 10/2013 | Dua | A41D 27/245 442/189 |
| 2014/0042767 | A1 | * | 2/2014 | Filipp | B32B 3/263 296/70 |
| 2014/0053969 | A1 | * | 2/2014 | Woods, II | D06M 17/10 156/93 |
| 2014/0079901 | A1 | * | 3/2014 | Gold | B32B 3/18 428/61 |
| 2014/0134391 | A1 | * | 5/2014 | Lumb | B32B 5/024 428/102 |
| 2014/0323004 | A1 | * | 10/2014 | Mihara | B29C 43/203 442/311 |
| 2015/0167208 | A1 | * | 6/2015 | Bischoff | D03D 15/47 442/59 |
| 2016/0052465 | A1 | * | 2/2016 | Wenzel | B60N 2/5891 296/1.08 |
| 2018/0079371 | A1 | * | 3/2018 | Iwasaki | D05B 23/00 |
| 2019/0016242 | A1 | * | 1/2019 | Kato | B32B 1/00 |

FOREIGN PATENT DOCUMENTS

| | | | | |
|---|---|---|---|---|
| EP | 1491105 | A1 | 12/2004 | |
| JP | S6222682 | A | 1/1987 | |
| JP | S63242606 | A | 10/1988 | |
| JP | S63291748 | A | 11/1988 | |
| JP | H031938 | A | 1/1991 | |
| JP | H06136173 | A | 5/1994 | |
| JP | H07314465 | A | 12/1995 | |
| JP | H08243271 | A | 9/1996 | |
| JP | H08309776 | A | 11/1996 | |
| JP | 2963642 | B2 | 10/1999 | |
| JP | 2003164680 | A * | 10/2006 | ............ B29C 66/71 |
| JP | 4391525 | B2 * | 12/2009 | ............ B29C 44/14 |
| JP | 4391525 | B2 | 12/2009 | |
| JP | 2013119688 | A | 6/2013 | |
| JP | 2014019060 | A | 2/2014 | |
| WO | 2006001067 | A1 | 1/2006 | |

OTHER PUBLICATIONS

Jan. 30, 2018, International Preliminary Report on Patentability issued in the International Patent Application No. PCT/JP2016/071776.

Oct. 25, 2016, International Search Report issued in the International Patent Application No. PCT/JP2016/071776.

Mar. 14, 2019, the Extended European Search Report issued by the European Patent Office in the corresponding European Patent Application No. 16830495.4.

* cited by examiner

SHEET-TYPE MOLDED BODY, AND LAMINATE

TECHNICAL FIELD

The present invention relates to sheet-type molded bodies and laminates which are used for automotive instrument panels, etc.

BACKGROUND ART

An automotive instrument panel has the structure that a polyurethane foam layer is provided between: a skin constituted by synthetic resin such as vinyl chloride resin, thermoplastic urethane resin, and thermoplastic olefin resin, or hides and leather; and a base material.

A skin of an automotive instrument panel is sometimes sewed with stitches or other patterns in order to improve design qualities and commercial value. In this case, there is a problem that when a polyurethane foam layer is formed over the back side of a skin, raw material of the polyurethane foam layer, etc. leak from holes of sewed portions to the surface side. Places where the raw material of the polyurethane foam layer, etc. leak change their color, which is a cause of spoiling the appearance of the automotive instrument panel.

As a method for preventing leakage of raw material etc. when a polyurethane foam layer is formed over the back side of a skin, for example, Patent Literature 1 discloses that in order to prevent a foaming agent etc. from leaking from holes of stitches of a skin member composed of a plastic sheet of vinyl chloride or the like, the holes of the stitches are sealed up by a method of attaching tape for sealing to the back side of the skin member, a method of carrying out crosslinking curing treatment of applying and drying an adhesive, a method of heating resin yarn on the back side, to melt the yarn when the stitches are the resin yarn, and so on. Patent Literature 2 discloses that a sewing place of a thermoplastic resin material of a molten condition is sewed with an upper thread and a lower thread, and cured, to integrate the thermoplastic resin material, the upper thread, and the lower thread, thereby gaps between the outer peripheral surfaces of the sewing threads with which the resin material is sewed and the resin material can be sealed.

CITATION LIST

Patent Literature

Patent Literature 1: JPH3-1938A
Patent Literature 2: JP2014-19060A

SUMMARY OF INVENTION

Technical Problem

When a skin member is made from resin as Patent Literatures 1 and 2, various additives such as plasticizers are usually added to the skin member for the purpose of improving flexibility etc. Each of these components transitions to a polyurethane foam layer over time due to heat etc. Thus, in some cases, the skin member changes its color over time.

When tape for sealing or an adhesive is used as Patent Literature 1, the transitioning speed of each of the components changes at a portion where the above material is used. Thus, the change in hue of this portion is different from that around this portion, and the fact that tape or an adhesive is applied to the back side is exposed, which is problematic. When resin yarn is molten, to carry out sealing as Patent Literature 1, a skin member is molten, decomposed, etc. at the same time, to debase design qualities, which is also problematic.

On the other hand, according to the method of Patent Literature 2, there is no need to seal the back side of a skin member. Thus, any problem like the above described Patent Literature 1 does not arise. However, it is necessary to melt sawing places using a heating apparatus or a heated sewing needle, which requires high-level temperature control, complicates a producing apparatus and producing steps, and costs high, which is problematic.

An object of the present invention is to provide a sheet-type molded body that can be produced by a simple method at low cost without damaging design qualities over time, and that makes it possible to prevent leakage of raw material etc. from sewed portions when backed with a polyurethane foam layer; and a laminate having the sheet-type molded body and the polyurethane foam layer.

Solution to Problem

That is, a first aspect of the present invention is a sheet-type molded body that is formed by sewing a sheet, wherein thread is used for at least part of said sewing, the thread being composed of a resin composition for thread containing resin for thread, the thread having a melting point of no more than 200° C.

In the present invention, preferably, the resin for thread, which composes the resin composition for thread, contains polyester and nylon as main components. In the present intention, the resin for thread "contains polyester and nylon as main components" means that the total of a nylon component and a polyester component contained in the resin for thread is no less than 80 mass %, to 100 mass % of the resin for thread.

In the present invention, preferably, the resin for thread contains no less than 50 mass % of nylon whose melting point is no more than 200° C.

In the present invention, the thread may fuse with at least one surface of the sheet.

In the present invention, the sheet may contain a resin composition for a sheet as a main component. In the present invention, the sheet "contains a resin composition for a sheet as a main component" means that the sheet contains no less than 80 mass % of the resin composition for a sheet, to 100 mass % of the sheet.

In the present invention, the resin composition for a sheet may be a resin composition for powder molding, and the resin composition for powder molding may be subjected to powder slush molding, to be the sheet.

Preferably, the resin composition for powder molding is composed of at least one selected from the group consisting of a vinyl chloride resin composition containing vinyl chloride resin, a urethane resin composition containing urethane resin, and an olefin resin composition containing olefin resin.

In the present invention, preferably, the resin composition for powder molding is the vinyl chloride resin composition.

In the present invention, preferably, an average degree of polymerization of the vinyl chloride resin is 800 to 5000.

In the present invention, preferably, the resin composition for powder molding contains 30 to 200 parts by mass of a plasticizer, to 100 parts by mass of the vinyl chloride resin.

In the present invention, preferably, said sewing is carried out using upper thread and lower thread, at least the lower thread being the thread that is composed of the resin composition for thread containing the resin for thread, and has the melting point of no more than 200° C. "Upper thread" here means thread arranged on a designing face (a face visually recognized from the outside. Hereinafter the same will be applied) side when the sheet-type molded body according to the first aspect of the present invention or a laminate according to a second aspect of the present invention, which will be described later, is disposed, and "lower thread" means thread arranged on the side opposite to the designing face when the sheet-type molded body according to the first aspect of the present invention or a laminate according to a second aspect of the present invention, which will be described later, is disposed.

A second aspect of the present invention is a laminate comprising: the sheet-type molded body according to the first aspect of the present invention; and a polyurethane foam formed body.

The laminate according to the second aspect of the present invention can be preferably used as a laminate for an automotive instrument panel.

Advantageous Effects of Invention

The present invention makes it possible to provide a sheet-type molded body that can be produced by a simple method at low cost without damaging design qualities over time, and that makes it possible to prevent leakage of raw material etc. from sewed portions when backed with a polyurethane foam layer; and a laminate having the sheet-type molded body and the polyurethane foam layer.

DESCRIPTION OF EMBODIMENTS

Hereinafter embodiments of the present invention will be described. The following embodiments are examples of the present invention, and the present invention is not limited to the following embodiments. In the following drawings, some members may be omitted or exaggerated.

<Sheet-Type Molded Body, and Laminate>

A sheet-type molded body of the present invention is formed by sewing a sheet, wherein thread is used for at least part of said sewing, the thread being composed of a resin composition for thread containing resin for thread, the thread having a melting point of no more than 200° C. The laminate of the present invention has a skin layer constituted by the sheet-type molded body, and a polyurethane foam layer constituted by a polyurethane foam formed body.

Hereinafter the sheet-type molded body, and the laminate according to one embodiment of the present invention will be described with reference to FIGS. 1 and 2.

Figure 1:
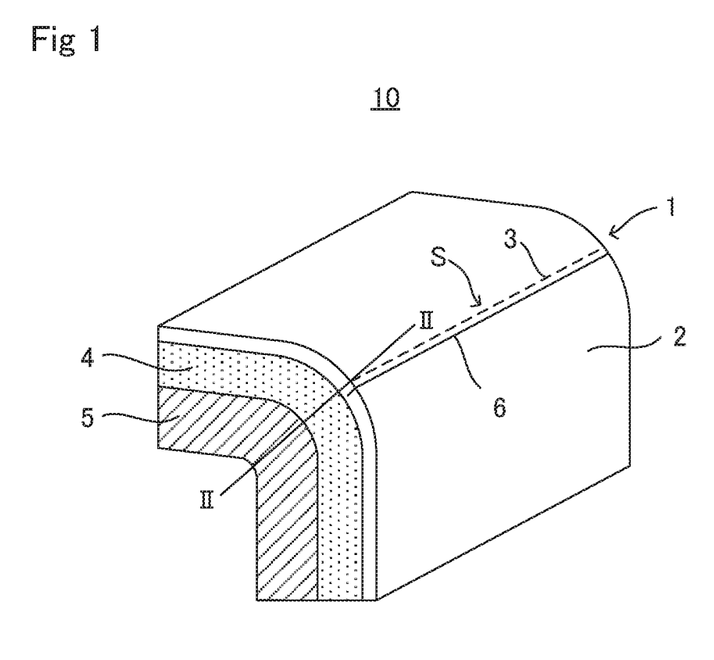
FIG. 1 is a perspective view of a laminate 10 according to one embodiment of the present invention.

FIG. 1 is a perspective view of a laminate 10 according to one embodiment of the present invention. FIG. 2 is a cross-sectional view of the laminate 10 taken along the line II-II in FIG. 1. FIG. 2 is focused on a portion including a repeating structure on the cross section, and both of the end portions are omitted.

As shown in FIG. 1, the laminate 10 has the structure of laminating a sheet-type molded body 1 formed by sewing (stitches S) on a sheet 2 using thread 3, a polyurethane foam formed body 4, and a base material 5 in this order. A recessed groove 6 is formed on the laminate 10 along the stitches S for the purpose of giving such beauty that it is as if skin members constituted by the sheets 2 were sewed together. As shown in the cross-sectional view in FIG. 2, the thread 3 consists of upper thread 3a and lower thread 3b. The sheet 2 is lockstitched using the upper thread 3a and the lower thread 3b, to make the stitches S. As shown in FIG. 2, the upper thread 3a constitutes part of a designing face of the laminate 10 (that is a face visually recognized from the outside when the laminate 10 is disposed. Hereinafter the same will be applied) on the laminate 10, and plays a role of improving design qualities of the laminate 10. On the other hand, the lower thread 3b is usually not recognized from the outside. The lower thread 3b is arranged on the side where the polyurethane foam formed body 4 is laminated, and plays a major role in preventing leakage of raw material etc. from sewed portions 7 when the polyurethane foam formed body 4 is laminated.

<Sheet>

The sheet in the present invention is used as a skin member of an instrument panel, a console box, or a door trim for an automobile, interior goods for a dwelling such as furniture, or the like. The sheet is a member of improving design qualities and commercial value.

Material of the sheet used in the present invention is not restricted. Resin such as vinyl chloride resin, thermoplastic urethane resin, and thermoplastic olefin resin, or hides and leather can be listed as the material. In the embodiment that the sheet is made from resin, the content of a resin composition for a sheet in the sheet is preferably no less than 80 mass %, more preferably no less than 85 mass %, further preferably no less than 90 mass %, and especially preferably 100 mass %, to 100 mass % of the sheet.

The resin composition for a sheet is not restricted as long as being a resin composition moldable into a sheet, and is preferably a resin composition for powder molding in view of excellent moldability, and small dependence on oil and low environmental burdens. Preferably, the resin composition for powder molding is subjected to powder slush molding, to obtain the sheet. As the resin composition for powder molding, a vinyl chloride resin composition containing vinyl chloride resin (PVC), a urethane resin composition containing urethane resin (preferably thermoplastic urethane resin (TPU)), an olefin resin composition containing olefin resin (preferably thermoplastic olefin resin (TPO)), and the like can be given. Among them, a vinyl chloride resin composition is preferably used. Hereinafter a vinyl chloride resin composition used as the resin composition for powder molding will be referred to as "vinyl chloride resin composition for powder molding".

Vinyl chloride resin contained in the vinyl chloride resin composition for powder molding (a) preferably includes a vinyl chloride resin particle whose average degree of polymerization is 800 to 5000 (a1). Vinyl chloride resin constituting the vinyl chloride resin particle (a1) includes homopolymer of vinyl chloride, and copolymer preferably containing no less than 50 mass %, and more preferably containing no less than 70 mass % of vinyl chloride units. Specific examples of comonomer for vinyl chloride copolymer include olefins such as ethylene and propylene; halogenated olefins such as allyl chloride, vinylidene chloride, vinyl fluoride, and chlorotrifluoroethylene; carboxylic acid vinyl esters such as vinyl acetate, and vinyl propionate; vinyl ethers such as isobutyl vinyl ether, and cetyl vinyl ether; allyl ethers such as allyl-3-chloro-2-oxypropyl ether, and allyl glycidyl ether; unsaturated carboxylic acids, and esters or acid anhydrides thereof such as acrylic acid, maleic acid, itaconic acid, 2-hydroxyethyl acrylate, methyl methacrylate, monomethyl maleate, diethyl maleate, and maleic anhydride; unsaturated nitriles such as acrylonitrile, and methacrylonitrile; acrylamides such as acrylamide, N-methylolacrylamide, acrylamido-2-methylpropanesulfonic acid, and (meth)acrylamidopropyltrimethylammonium chloride; and allylamines and derivatives thereof such as allylammonium benzoate, and diallyldimethylammonium chloride. The above monomers are only parts of monomers copolymerizable with vinyl chloride, and various monomers shown in The Nikkan Kogyo Shimbun, Ltd., Porienkabiniru (polyvinyl chloride), 1988, edited by Division of Polymer Sciences, Kinka Chemical Society, Japan, pages 75 to 104 can be used. One or at least two monomer(s) among them can be used. Vinyl chloride resin constituting the above described vinyl chloride resin particle (a1) also includes resin obtained by graft-polymerizing resin such as ethylene-vinyl acetate copolymer, ethylene-methyl methacrylate copolymer, ethylene-ethyl acrylate copolymer, and chlorinated polyethylene with (1) vinyl chloride, or (2) vinyl chloride, and the above described copolymerizable monomer.

Vinyl chloride resin constituting the above described vinyl chloride resin particle (a1) can be produced by any conventionally known producing method such as suspension polymerization, emulsion polymerization, solution polymerization, and bulk polymerization. In particular, vinyl chloride resin produced by suspension polymerization is preferable.

The average degree of polymerization of the above described vinyl chloride resin particle (a1) is preferably 800 to 5000, more preferably 800 to 3000, and further preferably 800 to 2000. The average degree of polymerization is measured confirming to JIS K 6720-2.

The average particle size of the above described vinyl chloride resin particle (a1) is not particularly limited, and is preferably 50 μm to 500 μm, more preferably 50 μm to 250 μm, and further preferably 100 μm to 200 μm. The average particle size of the vinyl chloride resin particle (a1) within the above range leads to improved powder flowability of the vinyl chloride resin composition for powder molding, and improved smoothness of a vinyl chloride resin molded body that the above described vinyl chloride resin composition for powder molding is subjected to powder molding, to form. The average particle size is measured conforming to test sieving using a JIS standard sieve specified in JIS Z 8801.

The vinyl chloride resin (a) may contain a vinyl chloride resin fine particle (a2) if necessary. The vinyl chloride resin fine particle (a2) functions as a dusting agent of improving powder flowability of the vinyl chloride resin composition for powder molding.

Vinyl chloride resin constituting the above described vinyl chloride resin fine particle (a2) can be produced by any conventionally known producing method such as suspension polymerization, emulsion polymerization, solution polymerization, and bulk polymerization. In particular, vinyl chloride resin produced by emulsion polymerization is preferable.

The average degree of polymerization of the vinyl chloride resin constituting the above described vinyl chloride resin fine particle (a2) is preferably 500 to 5000, more preferably 600 to 3000, and further preferably 700 to 2500. The average degree of polymerization is measured confirming to JIS K 6720-2.

The average particle size of the above described vinyl chloride resin fine particle (a2) is preferably 0.1 μm to 10 μm because the powder flowability of the vinyl chloride resin composition for powder molding is improved. For example, the average particle size is measured conforming to JIS Z8825, by laser diffraction using "SALD-2300" manufactured by Shimadzu Corporation.

The content of the vinyl chloride resin fine particle (a2) in 100 mass % of the above described vinyl chloride resin (a) is preferably 0 to 30 mass %, more preferably 1 to 30 mass %, further preferably 5 to 25 mass %, and especially preferably 8 to 20 mass %. The content of the above described vinyl chloride resin fine particle (a2) within the above range leads to good powder flowability of the vinyl chloride resin composition for powder molding.

The above described vinyl chloride resin composition for powder molding preferably contains a plasticizer. Specific examples of plasticizers include trimellitates such as tri-n-hexyl trimellitate, tri-n-heptyl trimellitate, tri-n-octyl trimellitate, tri-(2-ethylhexyl) trimellitate, tri-n-nonyl trimellitate, tri-n-decyl trimellitate, triisodecyl trimellitate, tri-n-undecyl trimellitate, tri-n-dodecyl trimellitate, tri-n-alkyl (the carbon number of each alkyl group is any of 6 to 12) trimellitate, trialkyl (the carbon number of each alkyl group is any of 8 to 10) trimellitate, and tri-n-alkyl (the carbon number of each alkyl group is any of 8 to 10) trimellitate; pyromellitate plasticizers such as tetra-n-hexyl pyromellitate, tetra-n-heptyl pyromellitate, tetra-n-octyl pyromellitate, tetra-(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl (the carbon number of each alkyl group is any of 6 to 12) pyromellitate; epoxidized vegetable oils such as epoxidized soybean oil, and epoxidized linseed oil; phthalic acid derivatives such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, benzyl butyl phthalate, dinonyl phthalate, and dicyclohexyl phthalate; isophthalic acid derivatives such as dimethyl isophthalate, di-(2-ethylhexyl) isophthalate, and diisooctyl isophathalate; tetrahydrophthalic acid derivatives such as di-(2-ethylhexyl) tetrahydrophthalate, di-n-octyl tetrahydrophthalate, and diisodecyl tetrahydrophthalate; adipic acid derivatives such as di-n-butyl adipate, di-(2-ethylhexyl) adipate, diisodecyl adipate, and diisononyl adipate; azelaic acid derivatives such as di-(2-ethylhexyl) azelate, diisooctyl azelate, and di-n-hexyl azelate; sebacic acid derivatives such as di-n-butyl sebacate, di-(2-ethylhexyl) sebacate, diisodecyl sebacate, and di-(2-butyloctyl) sebacate; maleic acid derivatives such as di-n-butyl maleate, dimethyl maleate, diethyl maleate, and di-(2-ethylhexyl) maleate; fumaric acid derivatives such as di-n-butyl fumarate, and di-(2-ethylhexyl) fumarate; citric acid derivatives such as triethyl citrate, tri-n-butyl citrate, acetyl triethyl citrate, and acetyl tri-(2-ethylhexyl) citrate; itaconic acid derivatives such as monometyl itaconate, monobutyl itaconate, dimethyl itaconate, diethyl itaconate, dibutyl itaconate, and di-(2-ethylhexyl) itaconate; oleic acid derivatives such as butyl oleate, glyceryl monooleate, and diethylene glycol monooleate; ricinoleic acid derivatives such as methyl acetylricinoleate, butyl acetylricinoleate, glyceryl monoricinoleate, and diethylene glycol monoricinoleate; stearic acid derivatives such as n-butyl stearate, and diethylene glycol distearate; other fatty acid derivatives such as diethylene glycol monolaurate, diethylene glycol dipelargonate, and pentaerythritol fatty acid ester; phosphoric acid derivatives such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, and tris(chloroethyl) phosphate; glycol derivatives such as diethylene glycol dibenzoate, dipropyrene glycol dibenzoate, triethylene glycol dibenzoate, triethylene glycol di-(2-ethylbutylate), triethylene glycol di-(2-ethylhexanoate), and dibutyl methylene bis(thioglycolate); glycerin derivatives such as glycerol monoacetate, glycerol triacetate, and glycerol tributylate; epoxy derivatives such as epoxy hexahydro diisodecyl phthalate, epoxy triglyceride, epoxidized octyl oleate, and epoxidized decyl oleate; so-called primary plasticizers such as polyester plasticizers including adipate polyesters, sebacate polyesters, and phthalate polyesters; and so-called secondary plasticizers such as chlorinated paraffin, fatty acid esters of glycol such as triethylene glycol dicaprylate, butyl epoxy stearate, phenyl oleate, and methyl dihydroabietate. One or at least two plasticizer(s) may be used. When a secondary plasticizer is used, a primary plasticizer whose mass is equal to or larger than that of the secondary plasticizer is preferably used together.

The content of the above described plasticizer, to 100 parts by mass of the vinyl chloride resin (a) is preferably 30 to 200 parts by mass, more preferably 60 to 170 parts by mass, and further preferably 90 to 160 parts by mass. The content of the above described plasticizer within the above range leads to good absorbency of the vinyl chloride resin (a) for the plasticizer, and good powder moldability of the vinyl chloride resin composition for powder molding.

The vinyl chloride resin composition for powder molding may contain perchloric acid-treated hydrotalcite as a stabilizer. Perchloric acid-treated hydrotalcite can be easily produced by, for example, adding and stirring hydrotalcite into a dilute aqueous solution of perchloric acid, and thereafter filtering, dehydrating, or drying the resultant as necessary, to substitute perchlorate anions ($ClO_4^-$) for at least a part of carbonate anions ($CO_3^{2-}$) in hydrotalcite (substitute 2 mol of perchlorate anions for 1 mol of carbonate anions). Any molar ratio between the above described hydrotalcite and perchloric acid can be set, and generally, the molar ratios is 0.1 to 2 mol of perchloric acid, to 1 mol of hydrotalcite.

The proportion of carbonate anions in untreated (unsubstituted) hydrotalcite for which perchlorate anions are to be substituted is preferably no less than 50 mol %, more preferably no less than 70 mol %, and further preferably no less than 85 mol %; and preferably no more than 95 mol %.

Hydrotalcite is a non-stoichiometric compound represented by the general formula: $[Mg_{1-x}Al_x(OH)_2]^{x+}[(CO_3)_{x/2} \cdot mH_2O]^{x-}$, and is an inorganic substance having a layered crystal structure composed of a positively charged basic layer of $[Mg_{1-x}Al_x(OH)_2]^{x+}$, and a negatively charged intermediate layer of $[(CO_3)_{x/2} \cdot mH_2O]^{x-}$. Here, x represents a number that is greater than 0 and no more than 0.33. Natural hydrotalcite is represented by $Mg_6Al_2(OH)_{16}CO_3 \cdot 4H_2O$. Synthetic hydrotalcite represented by $Mg_{4.5}Al_2(OH)_{13}CO_3 \cdot 3.5H_2O$ is commercially available. A method of synthesizing synthetic hydrotalcite is described in JPS61-174270A.

The content of perchloric acid-treated hydrotalcite, to 100 parts by mass of the vinyl chloride resin (a) is preferably 0.5 to 7 parts by mass, more preferably 1 to 6 parts by mass, and further preferably 1.5 to 5.5 parts by mass.

The above described vinyl chloride resin composition for powder molding may contain zeolite as a stabilizer. Zeolite is represented by the general formula: $M_{x/n} \cdot [(AlO_2)_x \cdot (SiO_2)_y] \cdot zH_2O$ (in the formula, M is a metal ion of a valence of n, x+y equals the number of tetrahedra per unit cell, and z is the number of moles of water). As a metal of M in the general formula, monovalent or divalent metals such as Na, Li, Ca, Mg, and Zn, and mixtures thereof can be given.

The content of zeolite is not restricted to any specific range. Preferred content thereof is 0.1 to 5 parts by mass, to 100 parts by mass of the vinyl chloride resin (a).

The above described vinyl chloride resin composition for powder molding may contain a fatty acid metallic salt as a stabilizer. As this fatty acid metallic salt, a metallic salt of a monovalent fatty acid is preferable, a metallic salt of a monovalent fatty acid having a carbon number of 12 to 24 is more preferable, and a metallic salt of a monovalent fatty acid having a carbon number of 15 to 21 is further preferable. Specific examples of fatty acid metallic salts include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. Metal composing the fatty acid metallic salt is preferably metal that can produce polyvalent cations, more preferably metal that can produce divalent cations, further preferably metal in the third to sixth periods of the periodic table which can produce divalent cations, and particularly preferably metal in the fourth period of the periodic table which can produce divalent cations. The fatty acid metallic salt is most preferably zinc stearate.

The content of a fatty acid metallic salt, to 100 parts by mass of the vinyl chloride resin (a) is preferably 0.05 to 5 parts by mass, more preferably 0.1 to 1 part by mass, and further preferably 0.1 to 0.5 parts by mass. The content of a fatty acid metallic salt within the above range makes it possible to lessen a value of color difference in the sheet that the vinyl chloride resin composition for powder molding is subjected to powder molding, to form.

The above described vinyl chloride resin composition for powder molding may contain a dusting agent other than the vinyl chloride resin fine particle (a2) (hereinafter, may be also referred to as "another dusting agent"). Examples of another dusting agent include inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among them, inorganic fine particles whose average particle size is 10 nm to 100 nm are preferable.

The content of another dusting agent is not limited to a specific range. The content thereof is preferably no more than 20 parts by mass, and further preferably no more than 10 parts by mass, to 100 parts by mass of the vinyl chloride resin (a).

The above described vinyl chloride resin composition for powder molding may contain other additives such as coloring agents, impact modifiers, perchloric acid compounds other than perchloric acid-treated hydrotalcite (for example, sodium perchlorate, and potassium perchlorate), antioxidants, fungicides, flame retardants, antistatic agents, fillers, light stabilizers such as ultraviolet absorbers, foaming agents, and β-diketones.

Specific examples of coloring agents include quinacridone-based pigments, perylene-based pigments, condensed polyazo pigments, isoindolinone-based pigments, copper phthalocyanine-based pigments, titanium white, and carbon black. One or at least two pigment(s) may be used. A quinacridone-based pigment is obtained through concentrated sulfuric acid treatment on a p-phenylene dianthranilic acid, and has a hue from yellowish red to reddish purple. Specific examples of quinacridone-based pigments include quinacridone red, quinacridone magenta, and quinacridone violet. A perylene-based pigment is obtained through condensation reaction of perylene-3,4,9,10-tetracarboxylic anhydride and an aromatic primary amine, and has a hue from red to red-purple or brown. Specific examples of perylene-based pigments include perylene red, perylene orange, perylene maroon, perylene vermilion, and perylene bordeaux. A condensed polyazo pigment is obtained through condensation of an azo dye in a solvent, to make the azo dye have a high molecular weight, and has a hue of a yellow or red pigment. Specific examples of condensed polyazo pigments include polyazo red, polyazo yellow, chromophthal orange, chromophthal red, and chromophthal scarlet. An isoindolinone-based pigment is obtained through condensation reaction of 4,5,6,7-tetrachloroisoindolinone and an aromatic primary diamine, and has a hue from greenish yellow to red or brown. Specific examples of isoindolinone-based pigments include isoindolinone yellow. A copper phthalocyanine-based pigment is a pigment in which copper is coordinated to a phthalocyanine, and has a hue from yellowish green to bright blue. Specific examples of copper phthalocyanine-based pigments include phthalocyanine green, and phthalocyanine blue. Titanium white is a white pigment constituted by titanium dioxide. Titanium white has high opacity, and exists in an anatase form and a rutile form. Carbon black is a black pigment having carbon as the main component, and also including oxygen, hydrogen, and nitrogen. Specific examples of carbon black include thermal black, acetylene black, channel black, furnace black, lamp black, and bone black.

Specific examples of impact modifiers include acrylonitrile-butadiene-styrene copolymers, methyl methacrylate-butadiene-styrene copolymers, chlorinated polyethylene, ethylene-vinyl acetate copolymers, and chlorosulfonated polyethylene. One or at least two impact modifier(s) may be used. An impact modifier becomes a heterogeneous phase of fine elastic particles in the vinyl chloride resin composition for powder molding, to disperse. When the above described vinyl chloride resin composition for powder molding contains the vinyl chloride resin particle (a1), a chain and a polar group which are graft-polymerized with this elastic particle are compatiblilized with the vinyl chloride resin particle (a1), which improves impact resistance of the sheet.

Specific examples of antioxidants include phenolic antioxidants, sulfuric antioxidants, and phosphoric antioxidants.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid ester; and inorganic hydroxides such as magnesium hydroxide, and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts, and quaternary ammonium salts; and non-ionic antistatic agents such as polyoxyethylene alkyl ethers, and polyoxyethylene alkyl phenol ethers.

Specific examples of fillers include silica, talc, mica, calcium carbonate, and clay.

Specific examples of light stabilizers include ultraviolet absorbers based on benzotriazole, benzophenone, nickel chelate, etc., and hindered amine light stabilizers.

Specific examples of foaming agents include organic foaming agents such as azo compounds including azodicarbonamide, and azobisisobutyronitrile, nitroso compounds including N,N'-dinitrosopentamethylenetetramine, and sulfonyl hydrazide compounds including p-toluenesulfonyl hydrazide, and p,p-oxybis(benzenesulfonyl hydrazide); chlorofluorocarbons, carbon dioxide gas, water, volatile hydrocarbon compounds such as pentane; and gaseous foaming agents such as microcapsules in which the above are encapsulated.

A β-diketone can be used as a stabilizer to more effectively suppress variation in the initial color tone of the sheet that the above described vinyl chloride resin composition for powder molding is subjected to powder molding, to obtain. Specific examples of β-diketones include dibenzoylmethane, stearoylbenzoylmethane, and palmitoylbenzoylmethane. One β-diketone may be used individually, or at least two β-diketones may be used in combination.

The content of a β-diketone is not limited to a specific range. The content thereof is preferably 0.1 to 5 parts by mass, to 100 parts by mass of the vinyl chloride resin (a).

A method of mixing the vinyl chloride resin (a), and additives added as necessary is not specifically limited. A preferred mixing method is to mix components other than a plasticizer and a dusting agent (vinyl chloride resin fine particle (a2)) by dry blending, and then mixing a plasticizer and a dusting agent in order. A Henschel mixer is preferably used for the dry blending. Temperature at the dry blending is preferably 50 to 100° C., and more preferably 70 to 80° C.

The sheet included in the sheet-type molded body and the laminate of the present invention is preferably obtained by powder molding on the above described vinyl chloride resin composition for powder molding, more preferably by powder slush molding on the above described vinyl chloride resin composition for powder molding. The temperature of a mold in the powder slush molding is preferably 200° C. to 300° C., and more preferably 220° C. to 280° C. The sheet can be preferably obtained by: sprinkling the above described vinyl chloride resin composition for powder molding over the mold of the above temperature range, leaving the mold to stand for 5 seconds to 30 seconds, thereafter shaking off excess of the composition, further leaving the mold to stand for 30 seconds to 3 minutes, thereafter cooling the mold to 10° C. to 60° C., and detaching the resultant from the mold. The sheet is preferably used as a skin for an instrument panel for an automobile, or for an automotive interior material other than an instrumental panel, such as a door trim.

The thickness of the sheet is not restricted to a specific range. The thickness thereof is preferably 100 μm to 3 mm, further preferably 500 μm to 2 mm, and especially preferably 800 μm to 1.5 mm.

<Thread>

In the present invention, thread is used for at least part of said sewing, the thread being composed of a resin composition for thread containing resin for thread, the thread having a melting point of no more than 200° C. The melting point of the thread is measured using 2 mg of a sample thereof with a differential scanning calorimeter (DSC) at 10° C./min in heating rate within the measurement temperature range of 30 to 300° C. in a nitrogen atmosphere. Temperature at which the endothermic peak of the largest area develops is defined as the melting point.

The melting point of the thread used in the present invention is preferably no more than 200° C., more preferably no more than 180° C., and further preferably no more than 170° C. in view of heating and melting processability when the thread is heated. On the other hand, the melting point of the thread is preferably no less than 30° C., more preferably no less than 60° C., and further preferably no less than 90° C. in view of sewing processability and heat aging resistance.

The resin composition for thread which constitutes the thread used in the present invention preferably contains resin for thread as the main component. That is, the content of the resin for thread that composes the resin composition for thread is no less than 80 mass %, preferably no less than 85 mass %, more preferably no less than 90 mass %, and further preferably 100 mass %, to 100 mass % of the resin composition for thread. Other additives such as titanium dioxide that functions as matting agents, fine particles of silica and alumina as lubricants, hindered phenol derivatives as antioxidants, and coloring pigments may be added as other components of the resin composition for thread as far as effect of the present invention is not ruined. The content of other additives is preferably no more than 20 mass %, to 100 mass % of the resin composition for thread.

The resin for thread used in the present invention is not restricted as long as being resin that can be shaped to thread. Main components of the resin for thread are preferably nylon and polyester. That is, the total of a nylon component and a polyester component composing the resin for thread is preferably no less than 80 mass %, more preferably no less than 85 mass %, further preferably no less than 90 mass %, and especially preferably 100 mass %, to 100 mass % of the resin for thread. The resin for thread containing nylon and polyester as the main components makes it easy to satisfy the above described range of the melting point of the thread, and to prevent leakage of raw material etc. from the sewed portions when the sheet-type molded body is backed with the polyurethane foam formed body.

The resin for thread used in the present invention may be a mixture of nylon and polyester, and may be a polymer alloy of nylon and polyester.

When containing nylon, the resin for thread preferably contains nylon whose melting point is no more than 200° C. The content of nylon whose melting point is no more than 200° C., contained in the resin for thread, is preferably no less than 50 mass %, more preferably no less than 65 mass %, further preferably no less than 80 mass %, and especially preferably no less than 85 mass %, to 100 mass % of the resin for thread. The content of nylon whose melting point is no more than 200° C., contained in the resin for thread, of the above lower limit or over makes it easy to satisfy the above described range of the melting point of the thread, and to prevent leakage of raw material etc. from the sewed portions when the sheet-type molded body is backed with the polyurethane foam formed body.

While the above described content is satisfied, the melting point of nylon contained in the resin for thread is preferably no more than 200° C., more preferably no more than 180° C., and further preferably no more than 170° C. On the other hand, the melting point of nylon contained in the resin for thread is preferably no less than 30° C., more preferably no less than 60° C., and further preferably no less than 90° C. in view of sewing processability and heat aging resistance.

When the resin for thread contains polyester, the content of polyester contained in the resin for thread is preferably no more than 50 mass %, more preferably no more than 35 mass %, further preferably no more than 20 mass %, and especially preferably no more than 15 mass %, to 100 mass % of the resin for thread.

The fineness of the thread used in the present invention is preferably no less than 500 dtex, more preferably no less than 800 dtex, further preferably no less than 900 dtex, and especially preferably no less than 1000 dtex. Fineness here means the total fineness as the thread, which may be either single yarn, or double or twisted yarn made of at least two strands of single yarn. The fineness of the thread of the above lower limit or over makes it easy to prevent leakage of raw material etc. from the sewed portions when the sheet-type molded body is backed with the polyurethane foam formed body.

Figure 2:
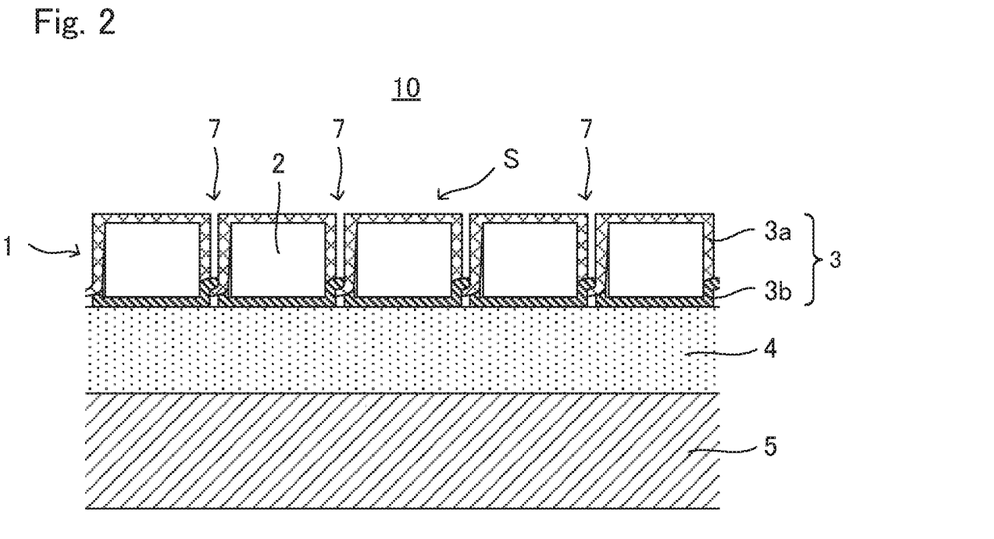
FIG. 2 is a cross-sectional view of sewed portions of the laminate 10 according to one embodiment of the present invention, taken along the line II-II in FIG. 1.

As illustrated in FIG. 2, when the sewing is carried out using upper and lower thread, thread that satisfies the above described conditions may be used as at least the lower thread. When thread that satisfies the above described conditions is used only as the lower thread, material of the upper thread is not restricted, and conventionally known thread can be used as the upper thread.

Preferably, thread that satisfies the above described conditions is used as both upper and lower thread in view of design qualities of a molding after the sewing.

According to the present invention, sewing with thread containing nylon and polyester as the main components makes it possible to prevent leakage of raw material etc. from the sewed portions when the sheet-type molded body is backed with the polyurethane foam formed body. Thus, it is not always necessary to fuse the thread with the sheet by heating etc. However, the thread may fuse with at least one surface of the sheet (at least a surface where the polyurethane foam formed body is laminated). Fusing the thread with at least one surface of the sheet, and backing the side of the surface where the thread is fused with the polyurethane foam formed body makes it easy to prevent leakage of raw material etc. from the sewed portions even if the pressure on the side of the surface where the thread is fused is high when the sheet-type molded body is backed with the polyurethane foam formed body.

FIG. 2 illustrates the embodiment of the sewing with lock stitch using the upper and lower thread. The sewing way is not restricted to this embodiment. For example, chain stitch using one thread may be carried out.

<Polyurethane Foam Formed Body>

The sheet-type molded body is backed with the polyurethane foam formed body. The following ways of laminating the polyurethane foam formed body to the sheet-type molded body can be given: after making the sheet-type molded body and the polyurethane foam formed body individually, sticking them together by thermal fusion bonding or thermal bonding, or using a known adhesive; making an isocyanate that is raw material of the polyurethane foam formed body react with a polyol on the sheet-type molded body, to polymerize them, and foaming polyurethane by a known method, to laminate the sheet-type molded body and the polyurethane foam formed body; and so on. The latter way is more preferable because having simpler steps, and making it possible to surely bond the sheet-type molded body and the polyurethane foam formed body together in a case where even laminates of various shapes are obtained. When the polyurethane foam formed body is laminated to the sheet-type molded body by the latter method, a member that covers the sewed portions (for example, reference sign 7 in FIG. 2) is preferably arranged on at least the sewed portions of the designing face. Arrangement of a member that covers at least the sewed portions makes it possible to further heighten effect of preventing leakage of raw material of polyurethane etc. from the sewed portions. A member covering the sewed portions is not especially limited as long as matching the shape of the sewed portions. This member has only to be made of metal, resin, wood, or the like.

According to the present invention, using the sheet-type molded body makes it possible to prevent leakage of an adhesive, raw material of polyurethane foam, etc. from the sewed portions even when the polyurethane foam formed body is laminated by any way as described above.

<Base Material>

In the present invention, the polyurethane foam formed body may be further backed with the base material. Having the base material makes it possible to improve rigidity of the laminate. The base material used in the present invention is not restricted, and known material such as metal and synthetic resin can be used. A method of laminating the base material is not restricted. The following methods can be given: after making the laminate of the sheet-type molded body and the polyurethane foam formed body, and the base material individually, sticking them together by thermal fusion bonding or thermal bonding, or using a known adhesive; foaming polyurethane between the sheet-type molded body and the base material by the known method described above; and so on. The latter method is more preferable because having simpler steps, and making it possible to surely bond the polyurethane foam formed body and the base material together in a case where even laminates of various shapes are obtained.

EXAMPLES

Hereinafter, the present invention will be described in more detail in the examples. The present invention is not restricted to the examples. "Part" and "%" used below will be by mass unless otherwise specified.

<Evaluation of Confirmation of Urethane Leakage>

A sheet-type molded body obtained by sewing a sheet using predetermined thread, and a laminate formed by laminating a polyurethane foam formed body to the sheet-type molded body were made as described below. The number of stitches under each condition was counted, and how many stitches which urethane leaked from was visually confirmed. Here, "urethane leakage" indicates that urethane could be seen from a stitched part of a designing face. The number of stitches where this urethane leakage occurred was divided by the total number of the stitches, to calculate the proportion of occurrence of the urethane leakage. The results are shown in Table 2.

Making Sheet-Type Molded Body, and Laminate

Example 1

The components other than the plasticizers and the dusting agent among the mixing components shown in Table 1 were put into a Henschel mixer, to be mixed. When the temperature of the mixture rose to 80° C., the plasticizers were added, and thereafter the mixture was dried up (this led to a state where the plasticizers were absorbed into vinyl chloride resin particles, which makes the mixture powdery). After that, when the mixture was cooled to no more than 70° C., the vinyl chloride resin made by emulsion polymerization, which is the dusting agent, was added, to prepare a vinyl chloride resin composition for powder molding.

The vinyl chloride resin composition for powder molding was sprinkled over a mold for texturing which was heated to 250° C., and the mold was left to stand for a time that was adjusted so that the thickness of a vinyl chloride resin molded sheet was 1 mm (specifically, 8 to 18 seconds), to melt the composition. After that, excess of the vinyl chloride resin composition for powder molding was shaken off, and the mold was left to stand still in an oven whose temperature was set at 200° C. When 60 seconds had passed after that, the mold was cooled by water, and when the temperature of the mold was cooled to 40° C., a vinyl chloride resin molded sheet of 150 mm×200 mm×1 mm in thickness (hereinafter referred to as "sheet") was detached from the mold.

The sheet was sewed. A sewing machine used here was LU-2860-7 manufactured by JUKI Corporation. The following sewing thread was used: upper thread: Ace Crown for vehicles #5 manufactured by Onuki Limited (100% polyester; 249° C. in melting point); and lower thread: KING MELTER No. 3 manufactured by FUJIX Ltd. (85% nylon, 15% polyester; 114° C. in melting point; 1160 dtex in fineness). The interval of stitches was 3 stitches/cm, and the speed was 3.3 stitches/sec. The sheet was sewed by approximately 9 to 10 cm in length twice under the above requirements, to make a sheet-type molded body according to Example 1.

An aluminum plate of 250 mm×340 mm×2 mm was placed over the bottom of a mold of 200 mm×300 mm×10 mm, and two obtained sheet-type molded bodies were aligned on a cover of 348 mm×255 mm×10 mm of the mold so that textured surfaces thereof were on the cover side, to be temporarily fixed severally. A mixed solution was made by mixing a polyol mixture consisting of 50 parts by mass of a propylene glycol PO/EO block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (product name: TEDA-L33, manufactured by Tosoh Corporation), 1.2 parts by mass of triethanolamine, 0.5 parts by mass of triethylamine, and 0.5 parts by mass of a foaming agent (product name: F-122, manufactured by Shin-Etsu Chemical Co., Ltd.), with polymethylene polyphenylene polyisocyanate (polymeric MDI), so that the mixing index was 98. This mixed solution was poured onto the mold, and the mold was hermetically sealed with the above described cover, to which the sheet-type molded bodies were temporarily fixed. Five minutes later, a laminate according to the example 1 that was a sample of backing a skin constituted by the sheet-type molded body of 1 mm in thickness with polyurethane foam of 9 mm in thickness and 0.18 g/cm$^3$ in density, and the aluminum plate in this order was taken out of the mold.

Example 2

A sheet-type molded body and a laminate according to the example 2 were made in the same way as the example 1 except that the sheet was sewed three times, and an iron for a household heated to 100° C. was pressed onto the back side of the sewed sheet for 30 seconds, to fuse lower thread.

Comparative Example 1

A sheet-type molded body and a laminate according to the comparative example 1 were made in the same way as the example 1 except that Ace Crown for vehicles #8 manufactured by Onuki Limited (100% polyester; 249° C. in melting point) was used as the lower thread used for the sewing, and the sheet was sewed three times.

TABLE 1

| Resin Composition | Mixed | Name of Raw Material | Manufactured by | Origin |
|---|---|---|---|---|
| Vinyl Chloride Resin | 100 | ZEST 2000Z | Shin Dai-ichi Vinyl Corp. | Suspension Polymerization Vinyl Chloride Resin Particle (average degree of polymerization: 2000, average particle size: 130 μm) |
| Plasticizer | 115 | TRIMEX N-08 | Kao Corp. | Trimellitate-based Plasticizer (n-$C_8$,$C_{10}$TOTM) |
|  | 5 | ADK CIZER O-130S | ADEKA Corp. | Epoxidized Soybean Oil (ESBO) |
| Stabilizer | 4.5 | ALCAMIZER 5 | Kyowa Chemical Industry Co., Ltd. | Perchloric Acid-partially Introduced Hydrotalcite (90% $HClO_4$-treated hydrotalcite) |
|  | 2.4 | MIZUKALIZER DS | Mizusawa Industrial Chemicals, Ltd. | Zeolite (Na-Zeolite) |
|  | 0.5 | Karenz DK-1 | Showa Denko K.K. | β-diketone (stearoylbenzoylmethane) |
|  | 0.2 | SAKAI SZ2000 | SAKAI CHEMICAL INDUSTRY CO., LTD. | Zinc Stearate |
| Dusting Agent | 20 | ZEST PQLTX | Shin Dai-ichi Vinyl Corp. | Emulsion Polymerization Vinyl Chloride Resin (average degree of polymerization: 800, average particle size: 2 μm) |
| Pigment | 4 | DA PX 1720(A) Black | Dainichiseika Color & Chemicals Mfg. Co., Ltd. | Coloring Agent |
| Sum Total | 251.6 |  |  |  |

TABLE 2

|  | n | Stitched | Leakage | Proportion of Occurrence |
|---|---|---|---|---|
| Ex. 1 | 1 | 25 | 0 | 0% |
|  | 2 | 25 | 0 |  |
|  | 3 | — | — |  |
|  | Total | 50 | 0 |  |
| Ex. 2 | 1 | 28 | 0 | 0% |
|  | 2 | 29 | 0 |  |
|  | 3 | 28 | 0 |  |
|  | Total | 85 | 0 |  |
| Comp. Ex. 1 | 1 | 25 | 11 | 52% |
|  | 2 | 20 | 14 |  |
|  | 3 | 17 | 7 |  |
|  | Total | 62 | 32 |  |

As shown in Table 2, no urethane leakage occurred to stitched portions of both laminates according to the examples 1 and 2. On the other hand, urethane leakage occurred to more than half of the total stitches of the laminate according to the comparative example 1, where thread whose melting point was over 200° C. was used as the lower thread.

REFERENCE SIGNS LIST

1 sheet-type molded body
2 sheet
3 thread
3a upper thread
3b lower thread
4 polyurethane foam formed body (polyurethane foam layer)
5 base material
6 recessed groove
7 sewed portions
10 laminate

The invention claimed is:

1. A molded body that is formed by sewing a sheet, wherein
thread is used for at least part of said sewing, the thread being composed of a resin composition for thread containing resin for thread, the thread having a melting point of no more than 200° C.,
the resin for thread contains no less than 80 mass % and less than 100 mass % of nylon whose melting point is no more than 200° C. and more than 0 mass % and no more than 20 mass of polyester to 100 mass % of the resin for thread, and
said sewing is carried out using upper thread and lower thread, only the lower thread being the thread that is composed of the resin composition for thread containing the resin for thread, and has the melting point of no more than 200° C.

2. The molded body according to claim 1, wherein the thread fuses with at least one surface of the sheet.

3. The molded body according to claim 1, wherein the sheet contains a resin composition for a sheet as a main component.

4. The molded body according to claim 3, wherein
the resin composition for a sheet is a resin composition for powder molding, and
the resin composition for powder molding is subjected to powder slush molding, to be the sheet.

5. The molded body according to claim 4, wherein
the resin composition for powder molding is composed of at least one selected from the group consisting of a vinyl chloride resin composition containing vinyl chloride resin, an urethane resin composition containing urethane resin, and an olefin resin composition containing olefin resin.

6. The molded body according to claim 5, wherein the resin composition for powder molding is the vinyl chloride resin composition.

7. The molded body according to claim 5, wherein an average degree of polymerization of the vinyl chloride resin is 800 to 5000.

8. The molded body according to claim 5, wherein
the resin composition for powder molding contains 30 to 200 parts by mass of a plasticizer, to 100 parts by mass of the vinyl chloride resin.

9. The molded body according to claim 1, wherein
said sewing is carried out using upper thread and lower thread, at least the lower thread being the thread that is composed of the resin composition for thread containing the resin for thread, and has the melting point of no more than 200° C.

10. A laminate comprising:
the molded body according to claim 1; and
a polyurethane foam formed body.

11. The laminate according to claim 10, wherein the laminate is a laminate for an automotive instrument panel.

12. The molded body according to claim 1, wherein the thread has a fineness of no less than 500 dtex.

* * * * *

UNITED STATES PATENT AND TRADEMARK OFFICE
CERTIFICATE OF CORRECTION

PATENT NO. : 11,052,635 B2  
APPLICATION NO. : 15/746130  
DATED : July 6, 2021  
INVENTOR(S) : Takanori Fujiwara Page 1 of 1

It is certified that error appears in the above-identified patent and that said Letters Patent is hereby corrected as shown below:

On the Title Page

Column 2, Item (56) In the FOREIGN PATENT DOCUMENTS on page 2:  
Line 11, please delete "JP 2003164680 A 10/2006" and insert --JP 2003164680 A 06/2003--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*